June 8, 1937.  A. M. JOHNSON ET AL  2,083,023
MACHINE TOOL
Filed May 13, 1935   3 Sheets-Sheet 1
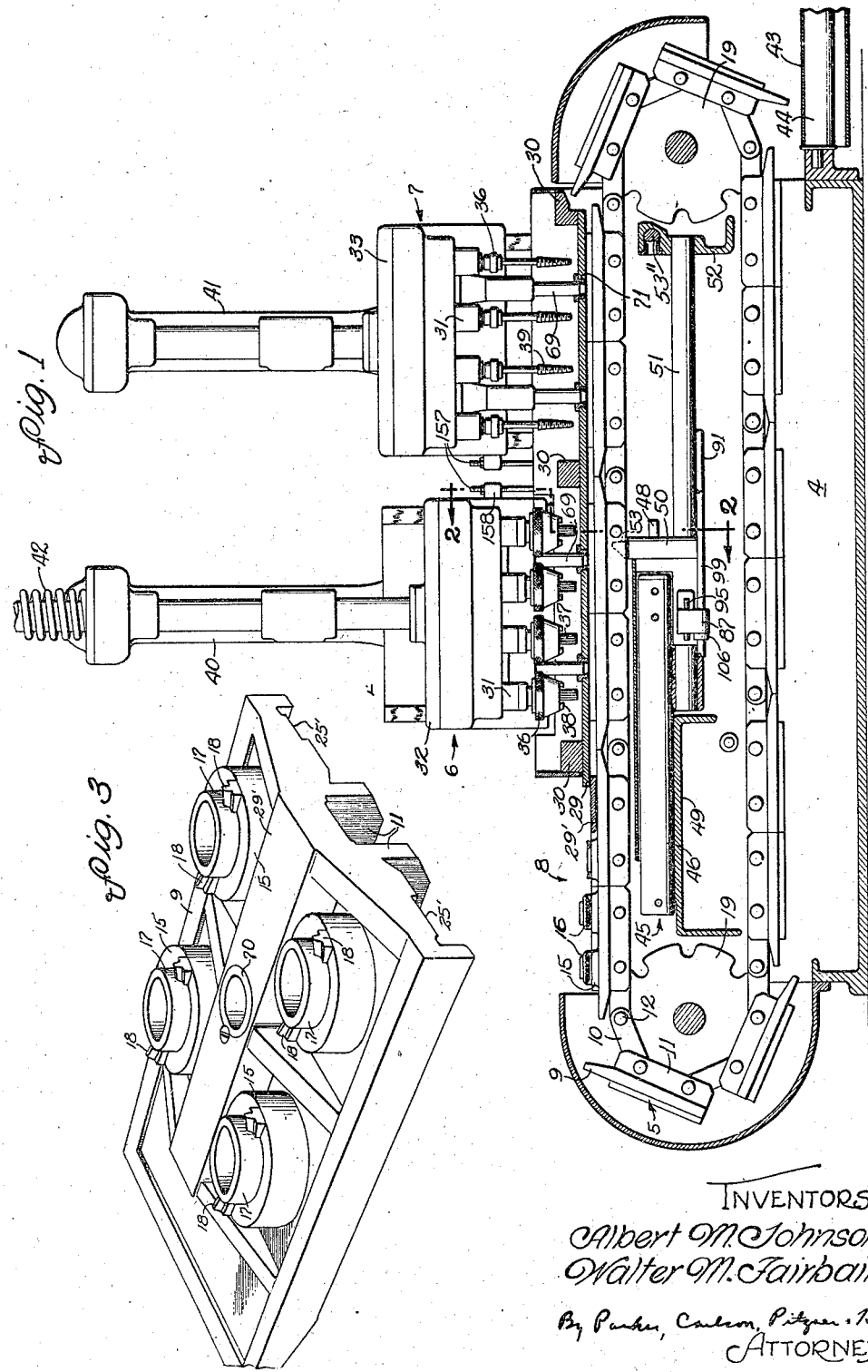
INVENTORS
Albert M. Johnson
Walter M. Fairbairn
By Parker, Carlson, Pitzner & Hubbard
ATTORNEYS

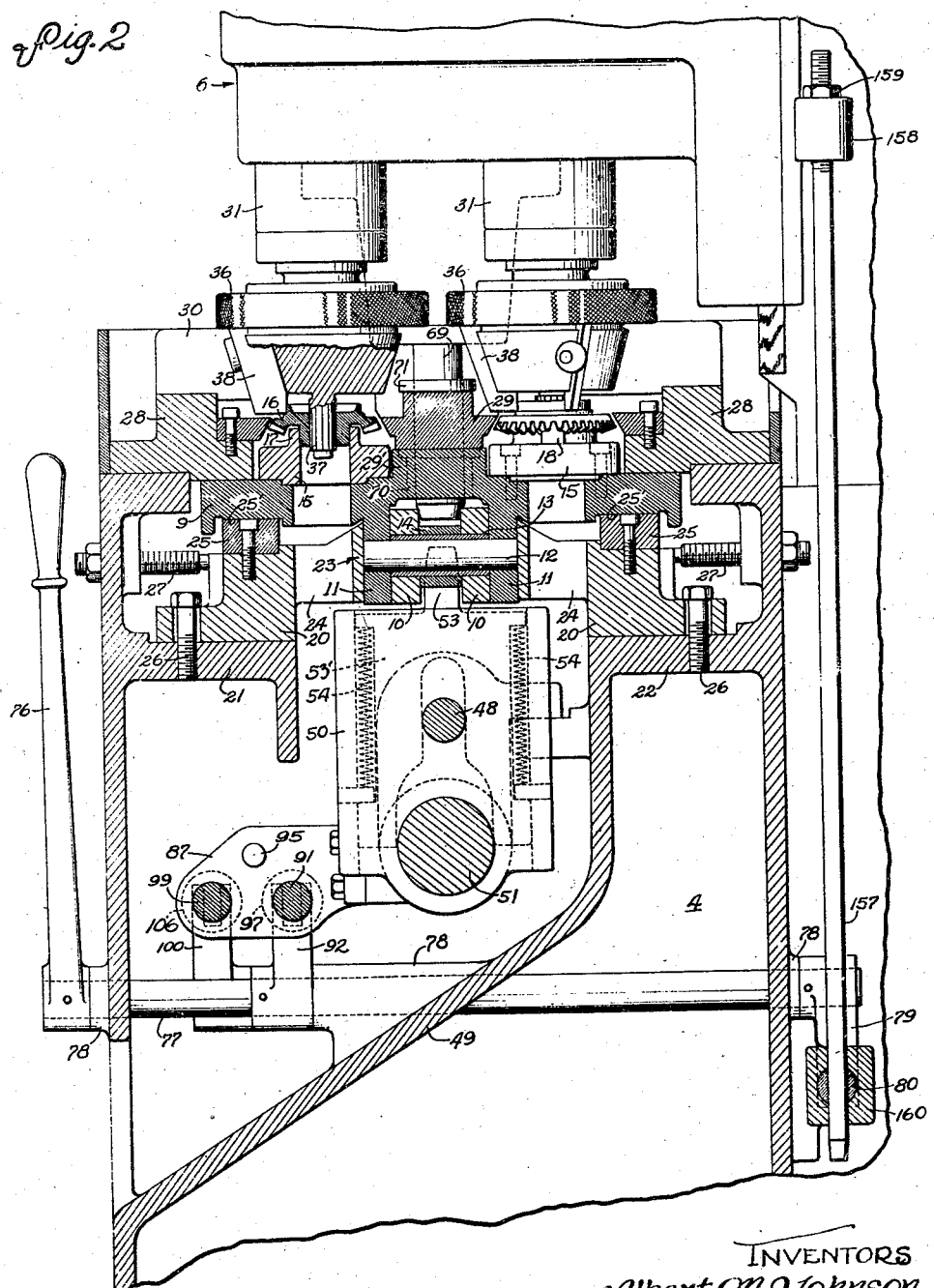

Fig. 4

Patented June 8, 1937

2,083,023

UNITED STATES PATENT OFFICE 2,083,023

MACHINE TOOL

Albert M. Johnson and Walter M. Fairbairn,
Rockford, Ill., assignors to Barnes Drill Co.,
Rockford, Ill., a corporation of Illinois Application May 13, 1935, Serial No. 21,214

28 Claims. (Cl. 29—26)

This invention has reference to machine tools of large productive capacity in which a plurality of tool units are arranged side by side and each equipped with multiple spindle heads operating successively upon a large number of stationarily supported work pieces; and it pertains particularly to the support of the work and to the presentation thereof to the cutting tools in proper timed relation.

The primary object of the invention is to provide a machine tool of the above general character which minimizes the time and effort required for handling the work; which has a high productive capacity; and in which the movements of the various parts are so coordinated and controlled as to permit the operation of the machine by an unskilled attendant.

Another object is to provide hydraulically actuated means for periodically indexing a work support of the conveyer type, whereby rapid yet smooth and shockless movements are imparted thereto.

Another object is to insure that the work carried upon the endless conveyer be held effectually against shifting while being operated upon by the cutting tools arranged for movement toward and from the work in a direction perpendicular to its indexing movement.

Another object is to provide an improved interlock between the indexing mechanism for positioning the work and the tool driving mechanism, whereby the operations of the various mechanisms are effectively synchronized.

A further object is to provide for the synchronization of the indexing mechanism with the drive mechanism of a plurality of independently reciprocable tool units, whereby the various mechanisms are invariable operated in the proper timed relation.

Still another object is to provide a simplified unitary control mechanism whereby all operations of the machine are conveniently controlled.

Other objects and advantages of the invention will become apparent from the following description taken in connection with the accompanying drawings, in which:

Figure 1 is a front elevational view of a machine tool embodying the invention, the front part of the base being cut away to more clearly show the work support and a part of the indexing mechanism.

Fig. 2 is a fragmentary sectional view of the machine tool taken along the line 2—2 of Fig. 1.

Fig. 3 is a perspective view of one of the links of the endless conveyer work support.

Fig. 4 is a diagrammatic representation of the indexing and tool drive mechanism, and the hydraulic interlock and control system for the same.

In the exemplary embodiment illustrated in the drawings, the machine comprises a horizontally disposed elongated base 4 (Figs. 1 and 2) of hollow construction which provides a support for a movable work support 5 preferably in the form of an endless conveyer. At one side of the base are two multiple tool units 6 and 7 for operating upon the work as the support therefor is advanced in successive steps through the operation of a hydraulic actuated indexing mechanism enclosed within the hollow base. The work support is made of a length such as to provide a loading stage 8 at one end of the machine in advance of the operating or working stages opposite the two tool units, and provision is made for the discharge of the work, preferably automatically, at the opposite end of the machine.

As shown, the work supporting conveyer is formed of a series of supporting plates or tables in the form of suitably shaped links 9 (Figs. 1, 2 and 3) pivotally connected with adjacent links on either side by link bars 10, thus providing sufficient flexibility to permit the conveyer to run in an endless loop within the chamber provided by the hollow base 4. The links 9 are preferably constructed with a rectangular body portion having centrally disposed spaced parallel depending flanges 11 (Figs. 2 and 3) on its underside between which the link bars 10 may be conveniently secured by means of pivot pins 12. To minimize wear on the parts, a bearing 13 in the form of a sleeve, is provided on each pivot pin 12. The link bars 10 are formed with apertures adapted to slidably receive these bearings, and are maintained in their proper spaced relation by means of spacer sleeves 14 carried on the bearings 13 and disposed between the link bars.

To hold the work securely against rotative or other movement, work supporting fixtures or carriers 15 bolted or otherwise removably secured to the upper surface of the links 9, are provided. As shown in Fig. 2, the work carriers are formed with a central aperture adapted to receive the cylindrical shank of a work piece 16, which, by way of illustration, has been shown as a partially formed beveled gear blank. The work piece 16 is supported on an upstanding shoulder 17 formed around the aperture in the carrier and is held against rotation when being operated upon by a lug 18 projecting laterally from the shoulder 17 and disposed so as to engage a tooth of the gear blank. It will be apparent, of course, that work carriers of other shapes may be employed, and since they are removably mounted on the links, they can be readily interchanged to adapt the machine for operation on different types of work.

To provide for the presentation of the work to the tools, the work support or conveyer is arranged for movement longitudinally of the base 4. Movable support for the conveyer may be conveniently provided by sprockets 19 supported in any suitable manner at opposite ends of the base, and the upper run of the conveyer is preferably guided and rigidly supported in a slideway formed in the upper part of the base. As shown herein, the slideway may comprise a pair of guide members 20 (Fig. 2) supported in parallel laterally spaced relationship and extending longitudinally of the base. These guide members are carried by inwardly projecting flanges 21 and 22 formed, respectively, on the front and back walls of the base adjacent their upper edges and preferably carry guide plates 23 spaced therefrom by horizontally projecting arms 24. It will be obvious that the guide plates 23 are disposed so as to engage slidably with the outer faces of the flanges 11 of the conveyer links and thereby guide the same for movement longitudinally of the base.

To provide effective bearing surfaces for the conveyer, the guide members 20 may have separately formed slide rails 25 adapted to coact with downwardly facing bearing surfaces 25' formed longitudinally of the links 9 adjacent the lateral edges. These rails are preferably removably secured to the guide members to facilitate their replacement when necessary. In order to provide for lateral adjustment of the slideway, the members 20 may be adjustably secured to the flanges 21 and 22 as by clamping bolts 26 passing through suitably formed slots in the members and threading into tapped holes in the flanges 21. Accurate and secure positioning of the members is facilitated by adjusting screws 27 adapted to engage with their outer side walls.

Cooperating with the guide members and slide rails in guiding the conveyer links in the slideway and serving to prevent vertical movement thereof in the operating stages of the machine, are a pair of upper guide rails 28 and a central guide bar 29 (Figs. 1 and 2). The rails 28 are secured to the front and back walls of the base 4 and are suitably fashioned to project inwardly and partially overlie the links 9 in the slideway, thereby holding the same in the desired horizontal plane. Guide bar 29 may be supported at opposite ends and an intermediate point by bridging members 30 (Fig. 1) which are suitably positioned above the slideway. The bridging members are preferably carried upon the guide rails 28 so as to extend transversely of the slideway. The guide bar 29 may be conveniently secured to these members so as to extend longitudinally of the slideway and to slidably engage raised shoulder 29' formed substantially centrally of each link 9. The guide rails and guide bar effectively prevent any vertical movement of the links in the slideway, and moreover the formation thereon of suitable outwardly diverging side walls adapted to overlie the work on the carriers, provides a convenient means for holding the work in place.

For operating on the work, the tool units 6 and 7 are provided with suitable tools carried by rotative spindles 31 supported in reciprocatory heads 32 and 33, respectively. In the particular machine illustrated, each tool head is provided with eight spindles 31 arranged in two parallel rows of four rows each running longitudinally of the slideway and spaced to conform with the positions of the work carriers on the work support. Thus, eight separate work pieces may be operated on simultaneously by each tool unit.

Figure 4:
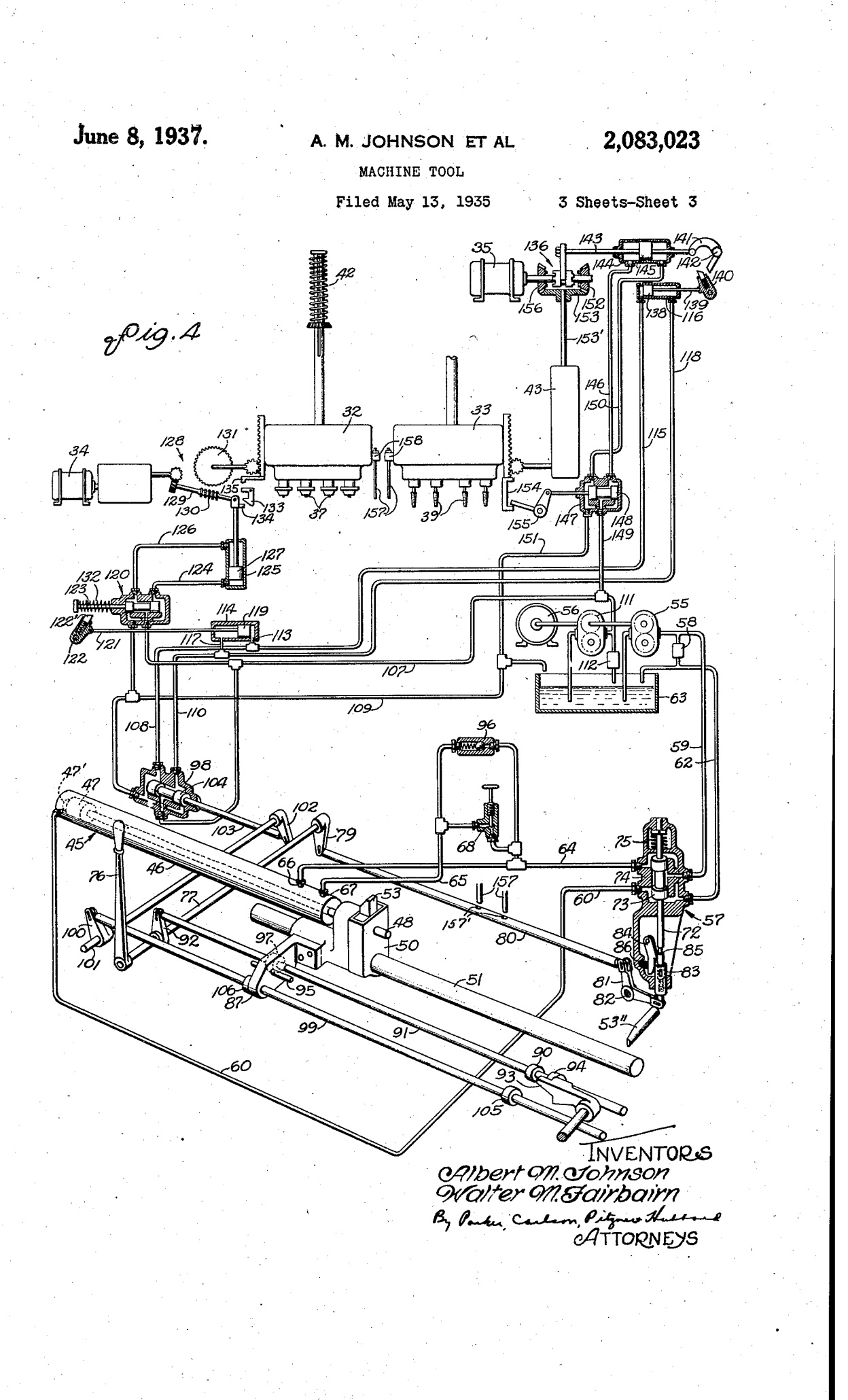

By way of illustration, the tool head 32 is shown equipped with tools for performing a reaming operation and a milling operation on each work piece, and tool head 33 is shown equipped with tools for performing a tapping operation. The tools may be rotated by means of suitable gearing (not shown) enclosed within the respective tool heads which provides the necessary connection with the driving motors 34 and 35 shown in Fig. 4. The tools may be conveniently held in suitable chucks 36 carried by the respective spindles, and in the case of the chucks provided for tool head 32, provision is made for carrying a reaming tool 37 and a milling cutter 38. Chucks provided for the tool head 33, as shown, are adapted for use with tapping tools 39 which may be of any suitable type.

To bring the tools into operative relation with the work, the tool heads 32 and 33 are supported so as to overhang the work support, and are mounted for reciprocation in substantially vertical planes on columns 40 and 41, respectively. Reciprocation of the tool heads toward and from the work may be effected by the usual mechanism provided for this purpose, and in the present instance is arranged so that the heads may be reciprocated independently. As shown herein, head 32 is arranged for positive feed only toward the work and may be retracted therefrom by any suitable means such as a compression spring 42. Head 33 in the present instance is arranged for positive feed both toward and from the work, the feed mechanism being of conventional form and shown diagrammatically at 43 in Fig. 4.

Columns 40 and 41 may be of any suitable construction and project upwardly from the rear side of the base, being spaced longitudinally with respect thereto so that the work may be moved progressively from one tool unit to the other for successive operations. As shown in Fig. 1, the columns and their respective tool units are located somewhat nearer the discharge end of the base so as to leave a clear space at the opposite end for the loading stage 8. This space is preferably of sufficient length to present two links 9 and their eight carriers 15 for loading. Each operating stage of the machine likewise provides for the accommodation of two conveyer links in operative relation with the respective tool units. Thus, while eight work pieces are being loaded upon the carriers positioned at the loading stage, a similar number of work pieces may be operated on by each tool unit. At the completion of an operation, the conveyer may then be advanced a step so that each set of links is moved ahead to the next position of the machine. Thus, a new supply of work loaded on to the carriers is presented to the first tool unit 6 and the work previously operated on by that tool unit, is presented to the second tool unit 7, at which a succeeding operation may be performed. The links previously in operative relation with tool unit 7, are moved out of the operating position and over the sprocket 19, whereby the work carried thereon is automatically discharged by the tilting of the links. Any suitable means for receiving the discharged work may be provided, as for example, a belt conveyer 43 running over a pulley 44 supported on the frame, as shown in Fig. 1 by way of illustration.

The nature of the operations performed by the tools of the machine herein shown, is such that the work must be held stationary in operative relation with the tools for a definite short period. Accordingly, the work support is moved intermittently in timed relation to the operation of the tool heads, thus presenting the work to the tools as required, and providing a suitable operating period during which the tools may operate upon the work. Movement of the work support is effected by the indexing mechanism which at the proper time advances the support in steps of sufficient length to properly position the work as above described. It will be readily apparent that the productive capacity of the machine will be appreciably affected by the time required to index the work support, and its efficiency will be increased directly as the indexing time is decreased. It is, therefore, desirable that the work support be moved from one position to the next as rapidly as practicable, having in mind that the movement should be as smooth and shockless as possible to the end that the parts will not be subjected to undue wear or strain. Moreover, it is essential that the indexing movement of the work support be accurately controlled so that the work is positioned properly, with respect to the tools.

With the above characteristics in view, the machine herein illustrated is provided with an indexing mechanism in the form of a hydraulic motor 45 arranged to impart the necessary movements to the work support in an advantageous manner. As a means of securing the simplest and most compact construction without sacrifice of efficiency, the hydraulic motor 45, in its preferred form, comprises a cylinder 46 having a reciprocable piston 47 (Fig. 4) to which is suitably secured a piston rod 48 projecting from one end of the cylinder. As shown in Fig. 1, the cylinder 46 is supported on a cross member 49 extending transversely of the base, the cylinder being disposed longitudinally of the base and immediately below the upper run of the endless conveyer work support. Secured to the projecting end of the piston rod 48 is a head 50 (Figs. 1, 2 and 4) slidably supported for reciprocation longitudinally of the base on a guide member 51. The guide member may be supported substantially centrally of the base, one end being carried by the transverse member 49, and the other end by a second transverse member 52 at the opposite end of the base. The head 50 is thus supported with its upper face immediately below the underside of the links constituting the work support and is reciprocable in a plane parallel thereto as an incident to the reciprocation of the piston 47 in the cylinder 46.

For the purpose of indexing the work support, the head 50 is arranged to coact therewith during its travel in one direction. To this end it is provided with a yieldable detent or dog 53 (Fig. 2) projecting upwardly from the head to engage cross members of the links 9; as for example, the sleeves 14 on the pivot pins 12 by which the link bars 10 are connected with the links. The detent may conveniently take the form of a tooth or lug formed on the upper edge of a rectangular plate 53' which is guided for endwise movement in a slot formed within the head 50. Yieldable support for the plate is provided by springs 54 bearing against oppositely disposed shoulders formed on the plate and walls of the slot, respectively, and effective to urge the plate outwardly and thereby position the dog 53 in the path of the sleeves 14. On the forward movement of the piston and head, the detent engages a sleeve 14 and is thus enabled to carry the conveyer links along and thereby index or position the same. No movement is imparted to the conveyer on the return movement of the head 50 by reason of the yieldable mounting of the dog, the inclined rear face thereof causing the dog to slide under the sleeves 14.

The forward or indexing movement of the piston 47 and head 50 is effected by admitting pressure fluid into the rear end of cylinder 46. This fluid may be conveniently supplied by a continuously operating pressure fluid pump 55 (Fig. 4) driven by an electric motor 56. The pump 55 delivers pressure fluid to a hydraulic circuit including a control valve 57 by means of which the admission of the fluid to the cylinder 46 is controlled. Uniform pressure is maintained in the system by means of relief valve 58 connecting with a pressure duct 59 into which the pump 55 discharges. With the valve 57 properly set, pressure fluid delivered by the pump through duct 59 is directed through a duct 60 to the rear end of cylinder 46, thereby forcing the piston 47 forwardly in the cylinder. Spent fluid in the forward end of the cylinder will be forced out through a system of ducts and valves, to a drain 62, from which it will be discharged into a sump or reservoir 63.

To facilitate stopping the work support in or very close to its proper position means for substantially retarding the movement of the piston as it approaches the end of its indexing stroke is provided. This means is conveniently incorporated in the duct and valve system above mentioned which is interposed between the forward end of cylinder 46 and valve 57. To this end cylinder 46 is provided with two spaced outlets adjacent its forward end, one outlet discharging through an unrestricted duct 64, the other discharging through a restricted duct 65. As shown in Fig. 4, an outlet 66 spaced substantially from the forward end of cylinder 46, connects with the unrestricted duct 64 adapted to be connected alternately with the pressure fluid duct 59 and with the drain 62 by the valve 57. A second outlet 67 disposed adjacent the end of the cylinder connects with the duct 65 which comprises a branch of the duct 64. In this duct there is interposed a restriction which may conveniently take the form of a needle valve 68, preferably adjustable to permit of varying the size of the opening presented. When pressure fluid is admitted to the cylinder 46 by way of duct 60, piston 47 is forced toward the forward end of the cylinder, and the fluid therein is discharged through the ducts 64 and 65. Duct 64 being unrestricted, the piston is enabled to move forward rapidly until it covers the outlet 66. Thereafter, the fluid is discharged through the duct 65 and needle valve 68, and piston movement is substantially retarded by reason of the restricted fluid passage through the valve. In this movement, the piston through the medium of the head 50 and work support engaging dog 53, advances the work support as before explained, the advance being rapid throughout the major portion of the movement, and retarded at the end, thus providing a cushioning effect. A positive stop 53" is provided for preventing the work support from being advanced too far by reason of the inertia of its moving parts.

After the work is moved into operative relation with the tool heads by the indexing of the work support, and before the tools are moved into engagement therewith, it is essential that the work and tools be alined with absolute accuracy. To this end a simple and effective means has been provided for so alining the work and for locking the same in place while being operated on. This means may conveniently take the form of rigid members carried by the tool head and engageable with the work support as an incident to the reciprocation of the head. In the preferred form as shown in the drawings, the members comprise dowel rods 69 (Figs. 1 and 2) adapted to engage complementary apertures in the work support. Two dowel rods are provided for each head and are disposed to project downwardly therefrom, and are spaced so that each rod engages a suitable aperture 70 in one of the links 9 of the conveyer. The dowel rods 69 are preferably guided and rigidly supported against lateral movement by sleeve members 71 set in the central guide bar 29. To insure proper entry of the dowel rods into the apertures 70 of the links which may not be exactly centered due to the necessary play in the conveyer, the ends of the rods may be beveled so as to present an inclined face to the edges of the aperture. Accordingly, as the rods are moved downwardly with the head, they are effective to shift the links longitudinally when necessary and thereby accurately aline the work and the tools. Moreover, during the time the tools are operating on the work, the work support will be held rigidly in place by the locking action of the dowel rods. This locking action will be maintained until the tools have been lifted clear of the work upon the return stroke of the head, thus preventing any possible injury to the tools or work by an accidental movement of the same.

Premature operation of the indexing mechanism is effectually prevented by an interlocking arrangement which synchronizes the operation of the indexing mechanism with the operation of the tool heads. This interlock further operates in conjunction with the manual control means, thereby materially simplifying the work of the attendant in operating the machine. The interrelationship between the various parts constituting the control means and the interlock, the whole of which may be conveniently referred to as the control mechanism of the machine, can be readily seen by reference to the schematic diagram shown in Fig. 4 of the drawings. The mechanism shown is, of course, designed primarily to control the particular machine tool selected to illustrate the principles of the invention. It illustrates the general way in which the operations of the indexing mechanism and the tool heads may be coordinated and controlled, and its application to machine tools of other types will be apparent.

In the previous description of the indexing mechanism, reference has been made to the valve 57 which controls the connection of the pressure fluid source to the hydraulic cylinder 46 for the purpose of indexing the work support. As shown in Fig. 4, the valve 57 is provided with a reciprocable plunger 72 having two piston enlargements 73 constituting a valve member disposed within the body 74 of the valve. The ducts 60 and 64 leading respectively to opposite ends of the cylinder 46 terminate in ports at one side of the valve. Two ports at the other side of the valve terminate the duct 59 leading from the pressure pump 55, and the drain duct 62 leading to the sump 63, respectively.

Plunger 72 of the valve 57 is urged upwardly by a compression spring 75 disposed in a chamber formed in the upper portion of the valve body and bearing against a collar carried by the plunger. The spring is normally prevented from raising the valve mechanism to its uppermost position, however, by a mechanical interlock to be described presently. To initiate the indexing operation, the plunger may be moved to its lower position in which it connects duct 60 with the pressure duct 59 by the actuation of a manual control lever 76 (Figs. 2 and 4). This lever is fast on one end of a rock shaft 77 rotatably supported transversely of the base in bearings 78 (Fig. 2) formed in the front and back walls of the base and in the transverse member 49. The shaft constitutes an element of a valve controlling linkage and is provided at its opposite end with a depending arm 79 to which one end of a horizontally disposed link 80 is pivotally connected. The other end of the link 80 is connected to one arm of a bell crank lever 81 (Fig. 4) which is pivoted on the base of the machine at 82 so as to rock in response to the longitudinal movement of the link 80 under control of the manual lever 76. The other arm of the bell crank lever is pivotally connected to the lower end of a sleeve 83 arranged to slidably fit over the lower end of the plunger 72. A limited movement of the sleeve relative to the plunger is provided by a pin-and-slot connection therebetween as shown in Fig. 4. Accordingly, the movement of the manual lever 76 to the left effects a shifting of the link 80 to the right, rocking the bell crank 81 which draws the plunger 72 downwardly against the force of the spring 75. In the lower position of the plunger, pressure duct 59 is connected with duct 60, thus admitting pressure fluid into the rear end of cylinder 46 which forces the piston 47 toward the forward end of the cylinder and indexes the work support as hereinbefore described.

To insure a complete indexing operation, the plunger 72 is latched in its lower position by means of a pivoted latch member 84. The latch 84 is provided with a projecting tooth adapted to engage with a shoulder 85 formed on the plunger 72, and is urged into engagement therewith by a spring 86 which bears against the free end of the latch. Thus, once the indexing operation is initiated by the positioning of plunger 72, as above described, it will invariably be carried through to completion by reason of the mechanical locking of the valve.

While pressure fluid is being admitted to duct 60, the valve 57 connects outlet duct 64 with the drain 62 so that the spent fluid in the forward end of the cylinder may be returned to the sump. Piston 47 in moving forwardly forces the spent fluid through the duct 64 and thence through the valve 57 and drain 62 to the sump. Upon the piston reaching the end of its stroke, the latch 84 is tripped automatically, thereby permitting the spring 75 to raise the plunger 72 to its uppermost position and reverse the pressure fluid connections to cylinder 46. The tripping of the latch may be conveniently effected by means of the sleeve 83 which, by reason of its slidable pin-and-slot connection with the plunger, may be lifted independently of the plunger in the movement of the bell crank lever 81 until it engages a cam surface on the latch member 84 and moves the same out of engagement with the shoulder of the piston rod.

The actuation of the bell crank lever 81 to trip the latch, is effected automatically by the head 50 acting through the medium of the control linkage associated with the manual control lever. For this purpose the head may be conveniently provided with a laterally projecting arm 87 (Figs. 1, 2 and 4) bolted or otherwise secured to the head and adapted to engage a stop or collar 90 on a control rod 91 as the head approaches its limiting position. The engagement of the arm with the collar shifts the control rod 91 to the right. The control rod is pivotally connected with a crank arm 92 fast on the shaft 77 so that the movement of the rod is effective to shift the link 80 to the left and rock the bell crank lever 81 on its pivot. Thus, the bell crank lever is enabled to raise the sleeve 83 and trip the latch 84, thereby freeing the plunger 72 which reverses the pressure fluid connections and interrupts the forward movement of the piston and indexing head. The collar 90 is adjusted on the rod 91 to trip the valve 57 at the same instant the piston rod 48 engages the positive stop 53".

In order to insure against the tripping of the valve latch before the piston 47 reaches the end of its stroke, means for locking the control rod 91 in place may be provided. In the present instance, this means takes the form of a pivoted stop member 93 having a shoulder interposed in the path of a collar 94 fast on the control rod. The collar engages the shoulder of the stop member, thereby preventing a shifting of the control rod to the right with a resultant operation of the valve 57. In order to lift the dog out of the path of the collar 94, arm 87 is provided with a projecting pin 95 adapted to engage an inclined cam face on the dog, and to swing the same upwardly on its pivot. The arm 87, by engaging the collar 90, may then shift the control rod to the right and trip the latch 84 as described.

With the valve 57 in its upper position, fluid connections to the cylinder 46 are reversed and pressure fluid is admitted to the forward end of the cylinder through the ducts 64 and 65. Piston 47 is thereby moved toward the rear of the cylinder until the arm 87 engages a rear stop collar 97 fast on the control rod 91, thereby shifting the control rod to the left. The collar 97 is so positioned that the control rod is shifted just sufficiently to draw the plunger 72 down into an intermediate or neutral position in the valve 57, thereby shutting off pressure fluid from both ducts leading to cylinder 46. This position of the valve is maintained until another operating cycle of the machine is initiated by the actuation of the manual lever.

In order that the rearward movement of the piston 47 may be effected as rapidly as possible, rapid initial movement is obtained by providing a by-pass around the restricting needle valve 68. This by-pass includes a one-way valve 96 which permits substantially unrestricted flow of pressure fluid to the cylinder while effectually preventing flow in the opposite direction. Accordingly, the piston 78 requires a minimum amount of time to execute its return stroke. The return stroke of the piston is limited by the extension 47' abutting the rear cylinder head wall.

As a further means of simplifying the manual control of the machine, the operation of the tool heads is synchronized with and automatically controlled in accordance with the operation of the indexing mechanism. The means for effecting this coordination as shown herein, comprises a control mechanism including a reversing valve 98 actuated by the conveyer engaging head 50 in its reciprocation, and operative to control the tool heads. For actuating the valve 98, there is provided a control rod 99 pivotally connected at one end with an upstanding arm 100 fast on a rock shaft 101 and slidably supported for longitudinal movement parallel with the head 50. The rock shaft 101 is rotatably supported transversely of the base and is provided with a depending arm 102 operatively connected by a rod 103 with the plunger or valve mechanism 104 of the valve 98. Control rod 99 is provided with two spaced collars 105 and 106 engageable with the arm 87 as an incident to the reciprocation of the head 50. The collar 105 engages with the arm on the forward movement of the head to its limiting position and shifts the valve 98 into its reversed position. The collar 106 engages with the arm on the rearward movement of the head to shift the valve to its normal position, as shown in Fig. 4 of the drawings.

Shifting of the valve 98 to reverse position at the end of the forward indexing movement of the work support actuating head 50 prepares the control mechanism of the tool heads for an operating cycle. In its reverse position, valve 98 connects a pressure duct 107 with a duct 108 and connects a drain duct 109 with a duct 110. Duct 107 leads from a source of pressure fluid such as a pump 111 which may be conveniently driven by the same motor 56 which drives the pump 55. The pressure of the fluid delivered to duct 107 is regulated by a relief valve 112 connecting with the duct. Duct 108, above mentioned, divides into two branches, one branch 113 connecting to the rear end of a valve control cylinder 114, and the other branch 115, connecting to the rear end of a second valve control cylinder 116. Duct 110 also divides into two branches, one branch 117 connecting to the forward end of the cylinder 114, and the other branch 118, connecting to the forward end of the cylinder 116. Cylinder 114 with its piston 119 comprises a means for controlling a reversing valve 120 by means of which the operating mechanism of the tool head 32 is controlled. This control is effected through the medium of a piston rod 121 adapted to actuate a pivotally supported rocking member 122. The admission of pressure fluid to the rear end of cylinder 114 upon the reversal of valve 98, forces the piston 119 to the left, thereby rocking the member 122 in a counterclockwise direction. Member 122 is provided with a yieldable detent 122' which projects outwardly into the path of the enlarged end of a valve rod 123 which controls the reversing valve 120. In its initial counterclockwise movement, the yieldable detent is depressed and passes to the left of the valve rod without actuating the same. When valve 98 returns to its normal position as above described, pressure fluid is admitted to the forward end of cylinder 114, and piston 119 is forced toward the rear of the cylinder. Clockwise movement is thus imparted to the rocking member, and in this movement, the yieldable detent engages with the end of the valve rod 123 to force the same to the right. The valve mechanism is thereby positioned so that pressure fluid duct 107 is connected with a duct 124 leading from valve 120 to the lower end of a clutch control cylinder 125.

At the same time, duct 126 leading from the upper end of the cylinder 125, is connected with drain 109 so that spent fluid in the upper end of the cylinder, may be returned to the sump 63. Piston 127, which is mounted for reciprocation in the cylinder 125, is moved upwardly in the cylinder by the fluid introduced into the lower end thereof, and in so moving it actuates a clutch mechanism 128 to complete a driving connection between the motor 34 and the mechanism for reciprocating the tool head 32. The clutch mechanism may be of any suitable type, that shown comprising a pivotally mounted driven shaft 129 carrying a worm gear 130 adapted to mesh with a worm wheel 131 when the shaft is shifted by the upward movement of piston 127. The worm wheel 131 may be arranged to drive the tool head downwardly in any suitable manner, as by a rack and pinion arrangement such as that shown in the drawings. In the particular embodiment herein illustrated, tool head 32 is arranged for positive drive in one direction only; that is, toward the work, and is returned to its normal position by means of the compression spring 42. The motor 34 may also drive the tool spindles of the head 32, suitable gearing (not shown) being provided for this purpose.

The actuation of valve 120 as above described, is of a momentary character, detent 122' swinging out of the path of the valve rod near the end of its arcuate path whereupon the valve is returned to normal position, as shown in the drawings, by a compression spring 132. Pressure fluid is thereby introduced into the upper end of the clutch control cylinder 125 but is ineffective at this time to shift the piston 127 by reason of mechanical latch 133 which holds the piston in its upper position and maintains the clutch 128 engaged. The latch 133 is suitably pivoted on the frame of the machine in a position to engage a projecting lug 134 carried on the outer end of the clutch shaft 129. Tool head 32 is fed downwardly toward the work while the clutch is engaged and when it reaches the bottom of its stroke, an arm 135 carried by the head engages a projecting arm formed on the latch 133, and rocks the latch out of engagement with the lug 134. The clutch shaft is thereby released and piston 127 is forced toward the lower end of the cylinder 125. In this movement, it shifts the clutch shaft 129 to disengage the clutch mechanism and release the tool head 32 which is thereupon returned to its normal position by the spring 42.

Simultaneously with the operations above described for tool head 32 but entirely independently thereof, the tool head 33 is also operated through a complete cycle. The character of the work performed by the tools provided for this tool head in the illustrative embodiment is such that positive feed in both the downward and return strokes is required. Moreover, to withdraw the tools from the work, it is necessary to reverse their rotation, and accordingly the direction of rotation of the spindles is reversed during the upward travel of the head. The positive feed and reversal are obtained in the present instance by means of a reversing clutch mechanism 136 operating through the gear mechanism 43 shown diagrammatically in Fig. 4. The gear mechanism may be of any suitable type and, as shown in the drawings, is arranged to reciprocate the tool head 33 by means of a rack and pinion drive connection.

When the piston 47 and the conveyor engaging head 50 complete their indexing stroke, valve 98 is reversed as hereinbefore described, and directs pressure fluid into the rear end of stop control cylinder 116 by way of the ducts 108 and 115. Piston 138, which is reciprocable in this cylinder, is thereby shifted to the right as viewed in the drawings (Fig. 4), and by means of its piston rod 139 it rocks a yieldable detent 140 in a clockwise direction. The detent projects into the path of a depending arm formed on a stop member 141 which is suitably pivoted on the frame of the machine at 142. The detent and depending arm are provided with complementary inclined faces which cause the former to be depressed and slide under the arm in this movement. The stop member remains in its normal position, as shown, in which it interposes the end of a horizontal arm in the path of a piston rod 143 which extends through a clutch control cylinder 144 and is rigidly secured to the piston 145 disposed within the cylinder. The stop member is so positioned that it holds the piston in an intermediate position in the cylinder against the force of pressure fluid introduced into the left end of the cylinder by way of a duct 146 leading from a reversing valve 147. The valve 147 is interposed between the pressure pump 111 and the clutch control cylinder 144, and is provided with the usual valve member 148 operative to connect a pressure duct 149 with either the duct 146 leading to the left end of the cylinder, or to a duct 150 leading to the right end of the cylinder. The valve also controls the connection of a drain duct 151 with either of the ducts 146 or 150, as required. The valve accordingly is effective to control the reciprocation of the head 33 and the rotation of the associated tool spindles through the medium of the clutch control cylinder 144, and in turn is controlled by the tool head in its reciprocation, as will appear presently.

After the completion of the indexing operation the conveyer engaging head 50 is returned to normal position and upon reaching this position, restores the valve 98 to its normal position, as before described. Upon reaching its normal position, valve 98 directs pressure fluid into the forward end of the stop control cylinder 116, thereby forcing the piston 138 toward the rear of the cylinder. In its rearward movement the piston rocks the detent 140 in a counterclockwise direction, and the detent at this time engages the depending arm of stop member 141 and rocks the same on its pivot 142. The horizontal arm of the member is thus moved out of the path of piston rod 143, permitting the piston 145 to move to the right and actuate the clutch mechanism 136. Bevel gear 152 is thereby drivingly connected with the shaft of motor 35. Gear 152 is arranged to drive the gear mechanism 43 through the medium of a gear 153 fast on a drive shaft 153'. The drive at this time is in a direction such that the tool head 33 is fed downwardly toward the work and the tapping tools carried by the head are rotated in the proper direction to perform their tapping operations.

As the head moves downwardly, the tools engage the work and perform the necessary operations thereon. At the end of the downward stroke the reversing valve 147 is actuated to reverse the flow of pressure fluid to clutch control cylinder 145, and to introduce pressure fluid into the forward end thereof. As shown herein, the means for actuating the valve 147 comprises a depending arm 154 carried by the head 33, which arm is provided with two spaced projecting lugs adapted to engage with one arm of a bell crank lever 155 in the upper and lower positions of the head, respectively. Upon the head reaching its lowermost position, the upper lug engages the bell crank arm and rocks the same in a counter-clockwise direction. The other arm of the bell crank lever is suitably connected with the valve member 148 of the valve 147, and is thereby moved to a reverse position as an incident to the completion of the tapping operation as indicated by the tool head reaching the end of its downward or feeding stroke. Valve 147 reverses the connections to the clutch control cylinder 145, as above explained.

Upon the reversal of the connections to the clutch control cylinder, pressure fluid is introduced by way of duct 150 into the right end of the cylinder 144, and piston 145 is shifted to the left. As a result of this shift, the clutch mechanism 136 is actuated to free the gear 152 from the drive shaft of motor 35, and to drivingly connect a gear 156 with the shaft. Gear 156 meshes with the gear 153 on the side opposite the gear 152 and is accordingly effective to rotate the gear 153 in the reverse direction. Gear mechanism 43 is thereby caused to raise tool head 33 and to rotate the tapping tools carried thereby in a direction such as to withdraw them from the work. The driving connection is interrupted upon the head reaching its normal position by the reoperation of the valve 147. This is effected by the lowermost lug of the arm 154 engaging the arm of bell crank lever 155 and rocking the lever in a clockwise direction. The valve then directs pressure fluid into the left end of cylinder 144 and forces piston 145 to the right to disengage gear 156 from the drive shaft. Engagement of the clutch with gear 152 is prevented at this time by the stop member 141 which drops into the path of piston rod 143 when piston 145 is shifted to the left to engage the gear 156. Upon the piston again being shifted to the right at the end of the operating cycle, one end of the piston rod engages the horizontal arm of the stop member which prevents the movement of the piston past the intermediate position of the cylinder and thereby renders the clutch mechanism inactive.

The mechanism above described effectively synchronizes the operation of the tool heads with the operation of the indexing means and renders the various operations controllable by the single manual control member. It will be apparent that the proper operation of the machine requires that each operating cycle be complete, and to this end, provision is made to insure against its interruption by improper manipulation of the control member prior to the completion of an operating cycle. This means may conveniently take the form of a mechanical interlocking mechanism whereby the manual control member is locked in place as long as either tool head is out of normal position, thus effectually preventing a reoperation of the indexing mechanism until the tool heads complete their working and return strokes. As herein shown, the interlock mechanism comprises a pair of vertical rods 157 carried by the respective heads and adapted to enter apertures 157' in the link 80 by which the manual control member 76 actuates the indexing valve 57. To provide for vertical adjustment of the rods, their upper ends are threaded into lugs 158 (Fig. 2) projecting inwardly from the heads 32 and 33, each rod being secured in adjusted position by a nut 159.

To guide and support the free ends of the rod, and also the link 80, a guide block 160 is provided on the rear of the base, as shown in Fig. 2. This block is formed with a horizontally disposed opening in which the link 80 is slidably supported for endwise movement. Intersecting this opening, and at right angles thereto, are two vertically disposed openings adapted to slidably receive the ends of the rod 157. These vertical openings are disposed so as to aline with the apertures 157' in the link when the manual control member is shifted to the neutral position, and serve to guide the rods 157 into the apertures, and also provides an effective lock whereby the link is securely held in place upon the rods engaging the apertures. The rods are preferably constructed of a suitable length to insure their entry into the apertures immediately upon the associated head moving out of normal positions. Thus, the link 80 is effectively locked in place while either tool head is reciprocating, and interruption of an operating cycle of the machine by improper manipulation of the manual control member, is effectually prevented.

In view of the foregoing, it will be apparent that we have provided a machine tool of high productive capacity, which is adapted to quickly and efficiently perform a variety of operations upon a large number of work pieces simultaneously. Moreover, the time and effort required for handling the work is reduced to a minimum by reason of the improved work presenting mechanism and the simple control mechanism associated therewith. The work presenting means includes indexing mechanism of advantageous character particularly adapted to provide rapid indexing of an endless conveyer type work support without subjecting the same to unnecessary wear or strain. Further, the control mechanism effectively coordinates the operations of the various elements of the machine, whereby their operation in the proper sequence and at exactly the right time, is insured. Injury to the work or tools by premature operation of the indexing mechanism, or accidental movement of the work support, is effectually prevented by a simple and efficient interlocking arrangement of novel construction. In addition, the manual control of the machine is simplified to such an extent that the machine may be operated efficiently and satisfactorily by an unskilled attendant.

We claim as our invention:

1. A machine tool having, in combination, a horizontally disposed elongated base, a work support movable longitudinally of said base and comprising an endless conveyer having links pivotally connected together, sprockets at opposite ends of the base for supporting the chain, work carriers mounted on the links of the conveyer, means on the base providing a slideway for the upper run of the chain and thereby supporting the work carriers, a tool supporting head mounted above the work support for reciprocation toward and from said carriers, indexing means comprising a hydraulic cylinder and piston mounted on said base below the slideway, and means carried by the piston operatively engageable directly with the links of said conveyer to impart an indexing movement thereto and thereby move the carriers successively into operative relation with the tools carried by said tool head.

2. A machine tool having, in combination, a horizontally disposed, elongated base, a work support movable longitudinally of said base and comprising an endless conveyer having links pivotally connected together, sprockets at opposite ends of the base for supporting the conveyer, work carriers mounted on the links of the conveyer, means on the base providing a slideway for the upper run of the conveyer and thereby supporting the work carriers, a tool supporting head mounted above the work support for reciprocation toward and from said carriers, means for reciprocating said head, indexing means comprising a hydraulic cylinder and piston mounted on the base below the slideway, means carried by the piston operatively engageable directly with the links of said conveyer to impart an indexing movement thereto and thereby move the carriers successively into operative relation with the tools carried by the tool head, and means for operating said head reciprocating means and said indexing means in timed relation.

3. A machine tool having, in combination, a horizontally disposed, elongated base, a work support movable longitudinally of said base and comprising an endless conveyer having links pivotally connected together, sprockets at opposite ends of the base for supporting the conveyer, work carriers mounted on the links of the conveyer, means on the base providing a slideway for the upper run of the conveyer and thereby supporting the work carriers, a tool supporting head mounted above the work support for reciprocation toward and from said carriers, hydraulically controlled means for reciprocating said head, indexing means comprising a hydraulic cylinder and piston mounted on the base below the slideway, means carried by the piston and directly engageable with said conveyer to impart an indexing movement thereto and thereby move the carriers successively into operative relation with the tools carried by the tool head, valve mechanism controlled by said piston carried means, and means including said valve mechanism for actuating said hydraulically controlled means to reciprocate the tool head in timed relation to the operation of said indexing means.

4. A machine tool having, in combination, a horizontally disposed, elongated base, a work support movable longitudinally of said base and comprising an endless conveyer having links pivotally connected together, sprockets at opposite ends of the base for supporting the conveyer, work carriers on the links of the conveyer, means on the base providing a slideway for the upper run of the conveyer and thereby supporting the work carriers, a tool supporting head mounted above the work support for reciprocation toward and from said carriers, means for reciprocating said head, indexing means comprising a hydraulic cylinder and piston mounted on the base below the slideway, means carried by the piston directly engageable with the conveyer to impart an indexing movement thereto and thereby move the carriers successively into operative relation with the tools carried by the tool head, manually operated means for initiating the operation of said indexing means, and means controlled by said indexing means for initiating the operation of said head reciprocating means.

5. A machine tool having, in combination, a horizontally disposed, elongated base, a work support movable longitudinally of said base and comprising an endless conveyer having links pivotally connected together, sprockets at opposite ends of the base for supporting the conveyer, work carriers mounted on the links of the conveyer, means on the base providing a slideway for the upper run of the conveyer and thereby supporting the work carriers, a tool supporting head mounted above the work support for reciprocation toward and from said carriers, hydraulically controlled means for reciprocating said head, indexing means comprising a hydraulic cylinder and piston mounted on the base below the slideway, means carried by the piston and operatively engageable with said conveyer to impart an indexing movement thereto and thereby move the carriers successively into operative relation with the tools carried by the tool head, a manually actuated member operative to initiate the operation of said indexing means, and valve mechanism actuated by said indexing means for initiating the operation of said hydraulically controlled head reciprocating means.

6. A machine tool having, in combination, a horizontally disposed, elongated hollow base, a work support movable longitudinally of said base and comprising an endless conveyer having links pivotally connected together, sprockets at opposite ends of the base for supporting the conveyer, work carriers mounted on the links of said conveyer, means on the base providing a slideway for the upper run of said conveyer and thereby supporting the work carriers mounted thereon, indexing means comprising a hydraulic cylinder and piston mounted in said base below the slideway, means carried by the piston directly engageable with said conveyer for imparting an indexing movement thereto, a tool supporting head mounted above the work support for reciprocation toward and from said carriers, means for actuating the tool supporting head, hydraulic means for controlling said actuating means, and a valve mechanism actuated by said piston carried means for initiating the operation of said hydraulic means.

7. A machine tool having, in combination, a frame, a tool supporting head mounted on said frame for reciprocation in a substantially vertical plane, a work support disposed below said head and movable relative thereto, work carriers mounted on said support, indexing means for intermittently moving said work support to position said carriers approximately in operative relation to the tools carried by said head, means for reciprocating the tool head, and means carried by the tool head and engageable with the work support incident to the reciprocation of the head for moving said work support to position said carriers accurately in operative relation to the tools and for locking the support in position during the movement of the head.

8. A machine tool having, in combination, a frame, a tool supporting head mounted on said frame for reciprocation in a substantially vertical plane, a work support disposed below said head and movable relative thereto, work carriers mounted on said support, apertures in said work support relatively spaced with respect to said carriers, indexing means for intermittently imparting an indexing movement to said work support to position said carriers approximately in operative relation to the tools carried by said head, means for reciprocating the tool head through a working stroke and a return stroke to cause the tools carried thereby to operate upon the work on the carriers operatively positioned with respect thereto, and means including a dowel rod carried by the head and engageable with an aperture in the work support incident to the movement of the head from normal position for positioning said carriers accurately in operative relation to the tools and for locking the work support in position until the head is returned substantially to normal position at the end of its return stroke.

9. A machine tool having, in combination, a horizontally disposed, elongated base, a work support movable longitudinally of said base and comprising an endless conveyer having links pivotally connected together, sprockets at opposite ends of the base for supporting the conveyer, work carriers mounted on the links of the conveyer, means on the base providing a slideway for the upper run of the conveyer, a tool supporting head mounted above the work support for reciprocation toward and from said carriers, means for intermittently moving the conveyer along said slideway to successively position the work carriers in substantially operative relation with the tools carried by the tool head, and means carried by the tool head and engageable with the conveyer as an incident to the reciprocation of the tool head for accurately positioning the work carriers in operative relation with the tools carried by the tool head.

10. A machine tool having, in combination, a horizontally disposed, elongated base, a work support movable longitudinally of the base and comprising an endless conveyer having links pivotally connected together, sprockets at opposite ends of the base for supporting the conveyer, work carriers mounted on the links of the conveyer, means on the base providing a slideway for the conveyer, a tool supporting head mounted above the work support for reciprocation toward and from said carriers, means for reciprocating said head, indexing means for intermittently moving the chain along said slideway to position the work carriers approximately in operative relation to said head, and means carried by the head and engageable with the conveyer as an incident to the reciprocation of the head for positioning the work carriers accurately in operative relation to the head and for locking the work support in position until the head is returned substantially to normal position.

11. A machine tool having, in combination, a horizontally disposed, elongated base, a work support movable longitudinally of said base and comprising an endless conveyer having links pivotally connected together, sprockets at opposite ends of the base for supporting the conveyer, work carriers mounted on the links of the conveyer, means on the base providing a slideway for the upper run of the conveyer and thereby supporting the work carriers, indexing means comprising a hydraulic cylinder and a piston mounted in said base below the slideway, means carried by the piston directly engageable with said conveyer for imparting an indexing movement thereto, a tool supporting head mounted above the work support for reciprocation toward and from said carriers, means for operating said indexing means to position certain of the work carriers substantially in operative relation with the tools carried by the tool head, and means carried by the tool head and engageable with the links supporting the positioned work carriers incidental to the reciprocation of the head for accurately positioning the work carriers in operative relation with the tools carried by the head.

12. A machine tool having, in combination, a horizontally disposed base, a pair of tool supporting heads mounted in spaced relation on the base for independent reciprocation in substantially vertical planes, means for reciprocating each of said heads through a working stroke and a return stroke, a work support disposed below and movable relative to said heads, said support comprising an endless conveyer having rigid links pivotally connected together, sprockets on opposite ends of the base for supporting the conveyer, work carriers mounted on the links of said conveyer, means on the base providing a slideway for supporting said carriers in operative relation to the tool heads, indexing means comprising a hydraulic cylinder and piston mounted on the base below said slideway, means carried by the piston directly engageable with the chain to impart an indexing movement thereto and thereby position said work carriers successively in operative relation to the tool heads, control means actuated by said indexing means for initiating the operation of said tool head reciprocating means, and means operative as an incident to the actuation of said control means for maintaining the operative condition of said head reciprocating means independent of said indexing means while the respective heads are reciprocated through their working and return strokes.

13. A machine tool having, in combination, a movable work support, a pair of tool supporting members independently reciprocable toward and from said work support, work carriers mounted on the work support, indexing mechanism for intermittently moving the work support to position said carriers successively in operative relation to the tools carried by said supporting members, means for reciprocating said tool supporting members to cause the tools thereof to operate on the work carried by the positioned carriers, and means carried by said supporting members and engageable with the work support incident to their reciprocation for locking the work support in position until both members substantially complete their reciprocations.

14. A machine tool having, in combination, a movable work support, a pair of tool supporting members independently reciprocable toward and from said work support, work carriers mounted on the work support, indexing mechanism for intermittently moving the work support to position said carriers successively in operative relation to the tools carried by said supporting members, manually actuated means for initiating the operation of said indexing means, means for reciprocating said tool supporting members to cause the tools thereof to operate on the work, means actuated by said indexing mechanism for initiating the operation of said reciprocating means, and means carried by the respective tool supporting members and operative incident to the reciprocation thereof for locking said manually actuated means against operation during the reciprocation of the members.

15. A machine tool having, in combination, a horizontally disposed elongated base, a work support movable longitudinally of said base and comprising an endless conveyer having links pivotally connected together, sprockets at opposite ends of the base for supporting the conveyer, a plurality of work carriers mounted on each link of the conveyer, means on the base providing a slideway for the upper run of the conveyer and thereby supporting the work carriers, a multiple spindle tool head mounted above the work support for reciprocation toward and from said carriers, indexing means comprising a hydraulic cylinder and piston mounted on said base below the slideway, and means carried by said piston operatively engageable with the conveyer to impart an indexing movement thereto whereby the work carriers previously positioned in operative relation to the tools carried in the spindles of said head are shifted out of such positions and a further set of work carriers are moved into such operative positions.

16. A machine tool having, in combination, a horizontally disposed, elongated base, a work support movable longitudinally of the base and comprising an endless conveyer having links pivotally connected together, sprockets at opposite ends of the base for supporting the conveyer, work carriers mounted on the links of the conveyer, means on the base providing a slideway for the upper run of the conveyer and thereby supporting said carriers, a pair of tool supporting heads relatively spaced longitudinally of the base and mounted above the work support for reciprocation toward and from said carriers, indexing means comprising a hydraulic cylinder and piston mounted on the base below said slideway, and means carried by said piston operatively engageable with the conveyer to impart an indexing movement thereto and thereby shift a set of carriers from operative relation with one of said tool heads to operative relation with the other of said tool heads and to shift a further set of carriers into operative relation with said one tool head.

17. A machine tool having, in combination, a movable work support, a pair of tool supporting members relatively spaced with respect to the axis of the work support and independently reciprocable at different speeds toward and from the same to perform successive operations on the work, indexing mechanism for intermittently moving the work support to thereby shift the work previously operated on by the first member into operative relation with the second member and to present other work to the first member, manually operable means for initiating the operation of said indexing mechanism, means for reciprocating said members to cause the same to operate upon the positioned work, and means controlled by said members for preventing the reoperation of said manually operable means until both members have finished their respective reciprocations.

18. A machine tool having, in combination, a movable work support, a pair of tool supporting members relatively spaced with respect to the axis of the work support and independently reciprocable at different speeds toward and from the same to perform successive operations on the work, indexing mechanism for intermittently moving the work support to thereby shift the work previously operated on by the first member into operative relation with the second member and to present other work to the first member, means for reciprocating said members to cause the same to operate upon the positioned work, and means carried by the respective tool supporting members for locking the work support in position and for locking the indexing means against operation until both members have finished their reciprocations.

19. A machine tool having, in combination, a movable work support, a pair of tool supporting members relatively spaced with respect to the axis of the work support and independently reciprocable at different speeds toward and from the same, work carriers mounted on the work support, indexing mechanism for intermittently moving the work support to shift the carriers whereby the carriers previously in operative relation with the first member are moved into operative relation with the second member and other carriers are moved into operative relation with said first member, means actuated by the indexing means incident to the completion of the indexing operation for initiating the reciprocations of said tool supporting members, and means controlled by said supporting members for preventing a succeeding operation of said indexing means until both members have completed their reciprocation.

20. A machine tool having, in combination, a movable work support, a pair of tool supporting members relatively spaced with respect to the axis of the work support and independently reciprocable at different speeds toward and from the same, work carriers mounted on the work support, indexing mechanism for intermittently moving the work support to shift the carriers whereby the carriers previously in operative relation with the first member are moved into operative relation with the second member and other carriers are moved into operative relation with said first member, a manually actuated control element operative to initiate the operation of said indexing means, means for automatically reciprocating said tool supporting members, means actuated by the indexing mechanism incident to the completion of the indexing operation for initiating the operation of said automatic means whereby the tool supporting members are reciprocated through a working stroke and a return stroke, and means controlled by said tool supporting members for preventing the reoperation of said manually actuated element until both members have completed their return strokes.

21. A machine tool having, in combination, a reciprocable tool head, a work support movable relative to said tool head, indexing mechanism for intermittently moving said work support to position work in operative relation with said tool head, means for operating said indexing mechanism, a manually operable member for controlling said operating means, and means carried by the tool head and engageable with said manually operable member incident to the reciprocation of the tool head for preventing the operation of said member.

22. A machine tool having, in combination, a reciprocable tool head, a work support movable relative to said tool head to position work in operative relation thereto, indexing mechanism operative to intermittently move said work support, manually operable means for initiating the operation of said indexing mechanism, means actuated by said indexing mechanism incident to its operation for initiating the reciprocation of said tool head, and means carried by the tool head and engageable with the manually operable means in the reciprocation of the tool head for preventing the reoperation of said manually operable means.

23. A machine tool having, in combination, a reciprocable tool head, a work support movable relative to said head to position work in operative relation thereto, indexing mechanism for intermittently imparting movement to the work support, means actuated by the indexing mechanism incident to its operation to initiate the reciprocation of the tool head, manually operable means including a shiftable link for initiating the operation of the indexing mechanism, an aperture in said link, and means including a rod carried by the tool head and adapted to be projected into said aperture incident to the reciprocation of the tool head for preventing the operation of said manually operable means while the tool head is reciprocating.

24. A machine tool having, in combination, a pair of relatively spaced reciprocatory tool heads, a movable work support for positioning work in operative relation with said tool heads, indexing mechanism for imparting movement to the work support, means for independently reciprocating said tool heads, means controlled by the indexing mechanism incident to its operation to initiate the operation of said reciprocating means whereby the tool heads are reciprocated through a complete operating cycle including a working stroke and a return stroke, and a manually operable member operative to initiate the operation of said indexing mechanism.

25. A link for an endless conveyer work supporting table having a rectangular body portion, a shoulder on the upper face of the body portion and disposed longitudinally and substantially centrally thereof, said shoulder being formed with an upper bearing surface adapted to slidably engage a guide member, downwardly facing bearing surfaces formed on the under side of the body portion along the lateral edges thereof and adapted to slidably engage supporting slide rails, and a pair of spaced depending flanges formed on the underside of the body portion intermediate said downwardly facing bearing surfaces and substantially parallel thereto, said flanges being formed with lateral bearing surfaces on their outer faces adapted to slidably engage guide plates to prevent lateral movement of the link.

26. A work support for a machine tool comprising, in combination, a plurality of separate plates adapted to support work to be operated on, each of said plates having a generally rectangular body portion, an upwardly projecting shoulder formed longitudinally and substantially centrally of the body portion to provide a bearing for engagement with a guide member, downwardly facing bearing surfaces formed on the underside of the body portion to extend longitudinally along the edges thereof for engagement with supporting slide rails, and a pair of spaced depending flanges formed on the underside of the body portion intermediate said downwardly facing bearing surfaces and substantially parallel thereto, and means operatively connecting adjacent plates comprising link bars pivotally attached at one end between the flanges of the respective plates and pivotally connected together at their opposite ends.

27. A machine tool having, in combination, a reciprocable tool head, a work support movable relative to said head for carrying work into operative relation to the head, a hydraulic motor for intermittently indexing said work support, valve mechanism controlling said motor, manually operable means for actuating said valve mechanism to initiate the operation of said motor, latch means operative to retain said valve mechanism in actuated position independently of said manually operable means to insure operation of the motor through a complete indexing cycle, and means actuated by said motor for releasing said latch means.

28. A machine tool having, in combination, a reciprocable tool head, a work support movable relative to said head for carrying work into operative relation to the head, means for intermittently indexing said work support including a hydraulic cylinder having a piston reciprocable therein, said piston carrying a member adapted to coact with the work support to index the same, valve mechanism having two positions effective respectively to direct pressure fluid into opposite ends of the cylinder to reciprocate the piston through forward and backward strokes, yieldable means tending to maintain said valve mechanism in one position, manual control means for operating said mechanism to the other position, latch means operative to maintain the mechanism in said other position independently of said manual control means to insure a full stroke of said piston in the cylinder, and means operated by piston at the end of its stroke for releasing said latch means to enable the mechanism to return to said one position under the influence of said yieldable means.

ALBERT M. JOHNSON.
WALTER M. FAIRBAIRN.